US008974286B2

(12) United States Patent  
Parrottino (10) Patent No.: US 8,974,286 B2
(45) Date of Patent: Mar. 10, 2015

(54) COMBINED BEHAVIOR SCHEDULES OF REINFORCEMENT SYSTEM

(76) Inventor: Antonio Mariano Parrottino, Calgary (CA)

( * ) Notice: Subject to any disclaimer, the term of this patent is extended or adjusted under 35 U.S.C. 154(b) by 814 days.

(21) Appl. No.: 12/453,804

(22) Filed: May 22, 2009

(65) Prior Publication Data

US 2010/0298052 A1 Nov. 25, 2010

(51) Int. Cl.
*A63F 13/40* (2014.01)
*G07F 17/32* (2006.01)

(52) U.S. Cl.
CPC ............ *A63F 13/10* (2013.01); *G07F 17/3267* (2013.01); *A63F 2300/638* (2013.01); *G07F 17/3244* (2013.01)
USPC .............................................. 463/20; 463/23

(58) Field of Classification Search
CPC ...................................................... G09B 19/00
USPC ............. 434/236, 238; 463/23, 37, 20, 21, 29
See application file for complete search history.

(56) References Cited

U.S. PATENT DOCUMENTS

| | | | |
|---|---|---|---|
| 5,370,399 A | 12/1994 | Liverance | |
| 5,611,729 A * | 3/1997 | Schumacher et al. | 463/18 |
| 5,833,538 A | 11/1998 | Weiss | |
| 5,941,773 A * | 8/1999 | Harlick | 463/26 |
| 5,971,850 A | 10/1999 | Liverance | |
| 6,231,445 B1 | 5/2001 | Acres | |
| 6,238,288 B1 | 5/2001 | Walker et al. | |
| 6,506,116 B1 | 1/2003 | Sunaga et al. | |
| 6,561,811 B2 | 5/2003 | Rapoza et al. | |
| 6,695,700 B2 | 2/2004 | Walker et al. | |
| 6,852,027 B2 | 2/2005 | Kaminkow et al. | |
| 7,704,137 B2 * | 4/2010 | Englman | 463/16 |
| 2002/0151347 A1 | 10/2002 | Jorasch et al. | |
| 2003/0078101 A1 * | 4/2003 | Schneider et al. | 463/42 |
| 2003/0232640 A1 | 12/2003 | Walker et al. | |
| 2004/0209685 A1 * | 10/2004 | Lucchesi et al. | 463/35 |
| 2004/0235551 A1 * | 11/2004 | Walker et al. | 463/16 |
| 2006/0211497 A1 * | 9/2006 | Manz | 463/37 |
| 2006/0258422 A1 * | 11/2006 | Walker et al. | 463/7 |
| 2007/0035094 A1 | 2/2007 | Elvidge | |
| 2007/0259319 A1 * | 11/2007 | Stock et al. | 434/236 |
| 2008/0102949 A1 * | 5/2008 | Hasegawa et al. | 463/31 |
| 2008/0108430 A1 * | 5/2008 | Evans | 463/27 |
| 2008/0113760 A1 * | 5/2008 | Baerlocher | 463/20 |
| 2008/0138777 A1 | 6/2008 | Rapoza et al. | |
| 2008/0200244 A1 * | 8/2008 | Rowe et al. | 463/27 |
| 2009/0058842 A1 * | 3/2009 | Bull et al. | 345/212 |
| 2009/0186692 A1 * | 7/2009 | Thomas et al. | 463/29 |
| 2009/0305766 A1 * | 12/2009 | Ashley et al. | 463/20 |
| 2010/0062825 A1 * | 3/2010 | Frick et al. | 463/17 |

* cited by examiner

*Primary Examiner* — Bruk Gebremichael
(74) *Attorney, Agent, or Firm* — Goodwin Law (57) ABSTRACT

A device and method of operating a device to modify the rate of behavior of a user and a method of operating the device which may be a gaming device. The gaming device comprises a display, an input device, a timer and a processor circuit in communication with the display, the input device and the timer. The processor circuit calculates a rate of inputs from the input device and compares the rate of inputs against a predetermined threshold and determines a game result utilizing a variable interval schedule of reinforcement when the rate is above a predetermined threshold and causes the display to display a game result to the user. The method comprises receiving a plurality of inputs from the user at a user input device, calculating a rate of input from the plurality of inputs, determining a result from the inputs utilizing a combined differential reinforcement of high rate schedule of reinforcement and a variable interval schedule of reinforcement and providing the result to the user.

14 Claims, 8 Drawing Sheets

| Result | Unmodified | Modified |
|--------|------------|----------|
| 1 | ¢25 | ¢50 |
| 2 | $1.00 | $2.00 |
| 3 | $2.00 | $4.00 |
| ⋮ | ⋮ | ⋮ |
| 20 | $100.00 | $200.00 |

COMBINED BEHAVIOR SCHEDULES OF REINFORCEMENT SYSTEM

BACKGROUND OF THE INVENTION

1. Field of Invention

The present invention relates to behavior reinforcement systems in general and in particular to a gaming apparatus, a method of operating a gaming apparatus and a method of modifying the behavior of the user of the apparatus.

2. Description of Related Art

In many fields of endeavor, it is often desirable to encourage a user to participate at a predetermined rate. For example in the field of gaming devices, it is desirable by both on the part of the establishment responsible the gaming machine and the individual user for the user to play at a high rate.

For the establishment, it is known that gaming devices on average typically collect more revenue than they award to the user during the time they are played. Therefore, the more times a gaming device is played, the greater revenue generating potential it has for the establishment. For the user, gaming devices offer enjoyment because they are fun and exciting to play through the opportunity to be provided a monetary award. The user may know that the more times they play the game in a given time frame the greater their chance of an award during that time frame.

However as many gaming machines utilize a random number generator, it is known that such methods of determining awards results are determined on a variable ratio schedule. In a variable ratio schedule, the player is reinforced with an award or other positive result on average one in every predetermined number of tries. Due to the use of variable ratio schedules in conventional gaming systems, the user's increasing rate of play will not often result in increasing the rate of being awarded by the gaming system in relation to number of tries. Accordingly, the user's increasing rate of play may or may not result in being rewarded at any moment of play in relation to the number of tries. Therefore, in conventional gaming systems there are unpredictable incentives for the player to play at a determined and sustained higher rate. The effects of these schedules are due to the contingencies which prevail at the moment of reinforcement under it. For example, although a player may play at a generally higher rate over a period of time, their play may fluctuate between high and low rates. The use of a variable ratio schedule may mean that any reward granted to such player is not awarded during a time during which the player is playing at a high rate and may therefore not have the desired effect of encouraging a sustained high rate of play. Such schedules are, in other words rather inaccurate ways of reinforcing rates of play.

SUMMARY OF THE INVENTION

According to a first embodiment of the present invention there is disclosed a method of operating a device to modify a behavior of a user. The method comprises receiving a plurality of inputs from the user at a user input device and calculating a frequency of input from the plurality of inputs. The method also comprises determining a result of the inputs utilizing a combined differential reinforcement of high rate schedule and a variable interval schedule and providing the result to the user.

The device may be a gaming device. Determining may comprise comparing the frequency of input against a predetermined threshold wherein the result is determined according to a variable interval schedule when the frequency is above the predetermined threshold.

The method may further comprise providing a visual representation to the user representing frequency of input to the user at an output device. The method may further comprise displaying the result to the user on a display.

According to a further embodiment of the present invention there is disclosed a computer readable medium encoded with processing instructions for implementing a method of operating a device to modify a behavior of a user. The method comprises receiving a plurality of inputs from the user at a user input device and calculating a frequency of input from the plurality of inputs. The method also comprises determining a result of the inputs utilizing a combined differential reinforcement of high rate schedule and a variable interval schedule and providing the result to the user.

According to a further embodiment of the present invention there is disclosed a gaming device comprising a display, an input device for receiving inputs from a user, a timer and a processor circuit in communication with the display, input device and timer which calculates a frequency of inputs from the input device and determines a game result utilizing a combined differential reinforcement of high rate schedule and a variable interval schedule. The processor circuit being operable to cause the display to display the game result to the user.

The said processor circuit may compare the frequency of inputs against a predetermined threshold wherein the game result is determined according to the variable interval schedule when the frequency is above a predetermined threshold. The game result may be determined according to one of a plurality of variable interval schedules wherein each of the plurality of variable interval schedules has a predetermined threshold. Each of the variable interval schedules may have a unique predetermined threshold. Each of the plurality of variable interval schedules may have a unique amount level at which gaming results are provided to a user The game result may be determined according to first variable interval schedule when the frequency is above the predetermined threshold and wherein the game result is set to a negative result when the frequency is below the predetermined threshold. The processor circuit may be operable to cause the display to provide a prompt to the user, the prompt instructing the user to provide inputs at a greater frequency when the frequency of inputs is below a predetermined threshold.

The gaming device may further comprise an indicator for providing an indication to the user representing the frequency of inputs as calculated by the processor circuit. The processor circuit may be operable to cause the indicator to indicate to the user that the frequency of inputs is greater than a predetermined threshold. The indicator may comprise a visual indicator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
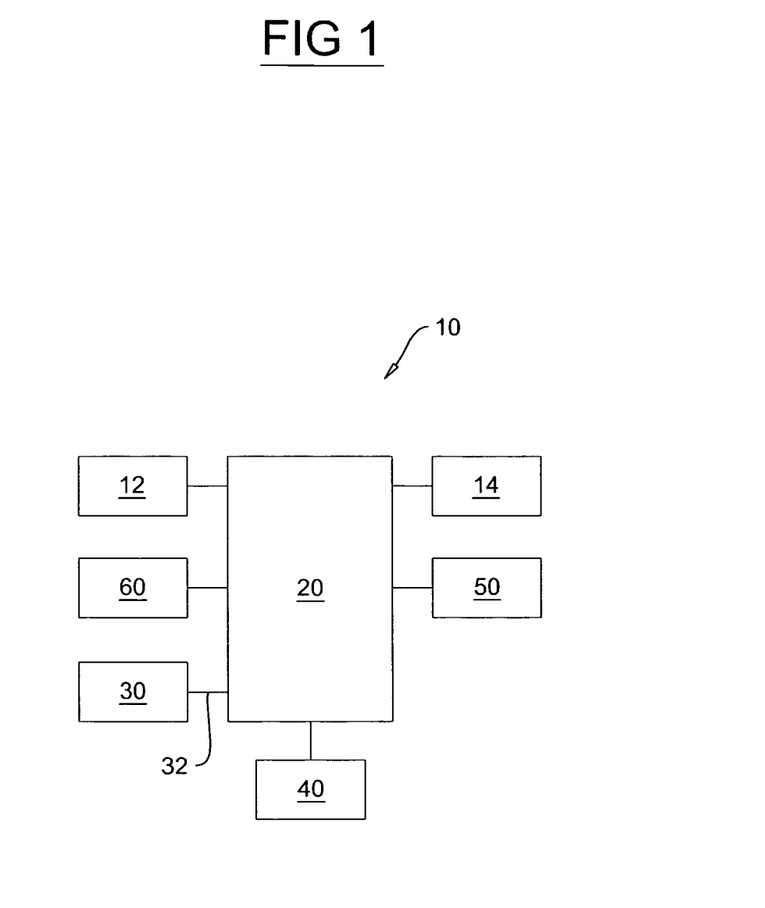
FIG. 1 is a schematic diagram of a gaming device according to one embodiment.

Referring to FIG. 1, a schematic diagram of operation of a gaming device according to a first embodiment of the invention is shown generally at 10. The gaming device 10 includes an input device 12, and output device 14 and a processor circuit 20. The input device 12 receives input from the user and transmits signals representing the user inputs to the processor circuit 20. The processor circuit 20 processes the user inputs to determine a game outcome and transmits signals representing the game outcome to the output device 14 for presentation to the user. It will be appreciated that in some embodiments, the input and output devices 12 and 14 may be combined in a single device, such as, for example, a touch screen display operable to display options to a user and receive selections therefrom.

The gaming device 10 also includes a clock 30 or other suitable timing device for providing a timing signal 32 to the processor circuit 20 and a memory device 40 for storing program code or other data. The processor circuit utilizes the timing signal 32 to calculate a frequency of inputs received from the input device 12. In some embodiments the timing signal 32 may be provided from a dedicated external clock although it will be appreciated that the timing signal 32 may also be provided from the clock signal for the processor circuit. In the present embodiment, the processor circuit includes a microprocessor or other suitable processor circuit as are generally known in the art. More generally, in this specification, including the claims, the term "processor circuit" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other, for example. Additional types of processor circuits will be apparent to those ordinarily skilled in the art upon review of this specification, and substitution of any such other types of processor circuits is considered not to depart from the scope of the present invention as defined by the claims appended hereto.

Figure 2:
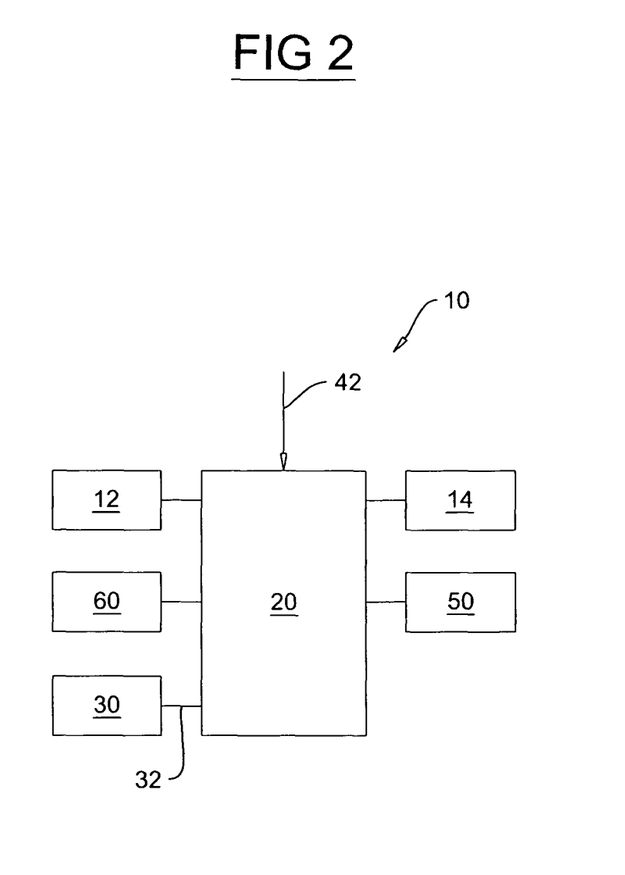
FIG. 2 is a schematic diagram of a gaming device according to another embodiment.

The processor circuit 20 is in communication with the memory device 40, which in this embodiment includes a hard disk drive. Alternatively, however, any other suitable memory device, such as compact discs (CDs), other types of magnetic disks or diskettes, optical storage devices, magnetic tapes, random access memories (RAMs), programmable read-only memories such as EPROMs, EEPROMs or FLASH memories, for example, or any other type of memory device, either at the location of the processor circuit or located remotely therefrom, may be substituted if desired. As illustrated in FIG. 2, the memory device may be provided from a remote location such as over a localized or distributed network 42, a file server, the internet or the like.

In some embodiments, the memory device 40 act as a computer readable medium providing instructions, including a plurality of routines, for directing a processor circuit to perform the functions associated with the various routines described herein. The memory device 40 may also contain data tables for use in calculating results and award amounts as further described below.

In some embodiments the gaming device 10 may include a feedback device 50. The feedback device 50 is operable to provide a feedback signal or feedback information to the user. In particular, in some embodiments the feedback device 50 provides feedback to the user when the user is providing inputs to the gaming device 10 at a rate above a predetermined threshold as further described below. In some embodiments, the feedback device may be a light which is illuminated when the user is providing inputs at a rate greater than the predetermined threshold. In other embodiments, the feedback device may be an auditory signal adapted to play a song, or provide a specific sound to the user upon the user reaching the threshold. In other embodiments, the feedback device may comprise a plurality of lights such that each light is adapted to be illuminated in response to a signal from the processor circuit 20 when the unique threshold for that light is surpassed. In this way it will be appreciated that the user will be provided with feedback relating to their current rate of play as will be further described below.

Figure 3:
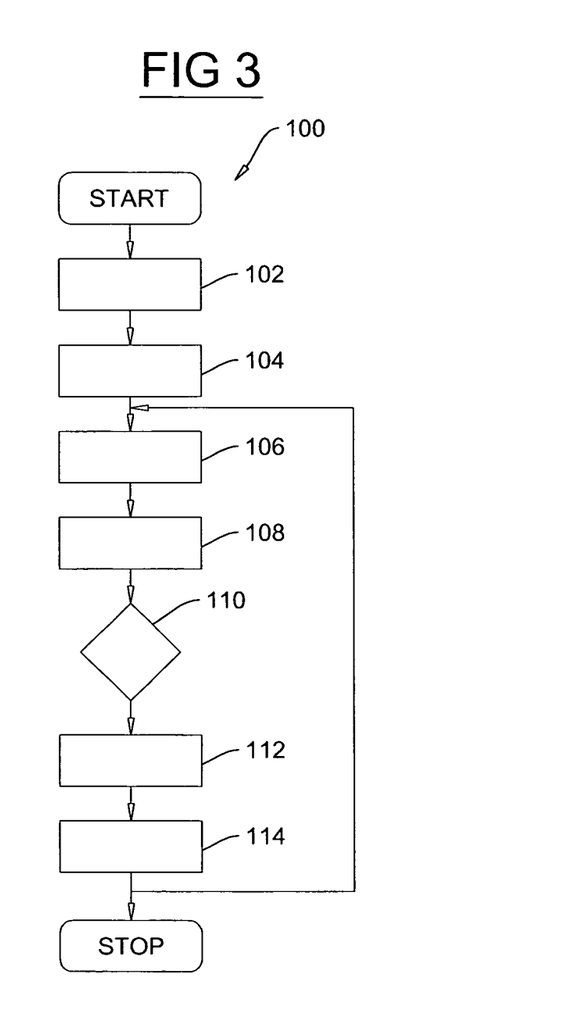
FIG. 3 is a flowchart showing the operation of the gaming device of FIG. 1 according to one embodiment.

Alternatively, the gaming device 10 may include an authorizing device 60 such as, by way of non-limiting example, a credit card authorizer, a currency collection slot or a token receipt slot. The authorizing device 60 receives from the user, the required input such as a currency bill, a credit card, or a player identification card to enable the user to have access to the activities on the gaming device. Turning now to FIG. 3, a flowchart for one process 100 of operating the gaming device 10 is illustrated. The process 100 begins by activating the gaming device 10 at step 102 by the input of a credit card, token, bill or the like into the authorizing device 60 or by other known means. It will be appreciated that for embodiments of the present invention directed to non-gambling devices may not require the authorizing device 60, nor the authorizing step 102. Examples of such devices may include console video games and the like.

The process then initializes the gaming device 10 in step 104. During initializing 104, the frequency of inputs to the gaming device 10 is set back to an initial value. The initial value could be a base frequency or a base game award level as will be further described below. The gaming device 10 then awaits a first input from the user in step 106. When the user provides an input to the gaming device 10 the processor circuit utilizes the timing signal 32 to calculate a frequency of inputs from said user. The processor circuit 20 looks up the predetermined frequency threshold from the memory device 40 in step 108 and then compares the calculated frequency to the threshold frequency in step 110. If the input frequency is greater than the threshold, the processor circuit determines the game result on a variable interval schedule in step 112. Methods of determining a result from a variable interval schedule are well known in the art. The processor circuit then presents the game result to the user in step 114. If the input frequency is not greater than the threshold or if the input frequency has fallen below the threshold frequency, the processor circuit presents a negative game result to the user in step 114 or provide feedback to the user through the display or the feedback device 50 that their rate of play is below the threshold. The user may then play again if they choose. It will be appreciated that in the context of slot machines or the like a negative result may be that no positive game results are possible and the player is not provided the opportunity to win. In such a context, the positive result is the ability to win the game which may include a win of the game itself. Thus a negative result in this context is the lack of ability to play or win the game or a lack of the positive result. In the context of a gaming machine, for example, the positive result may be the enjoyment of participating in the game, having the opportunity to win or lose that game as well as collect the rewards associated therewith. In such a context, a negative result is the absence of such an opportunity as regardless of the game outcome, the player will not have the opportunity to either win or lose and will not be playing the game. In other words, when the user does not play at a sufficiently high enough rate, they do not have the opportunity to receive the reward, but neither do they risk losing their bet as their bet is returned to them. In other contexts, other negative results may also be similar. It will be appreciated that according to the present methods, if the user does not play the game at a frequency high enough to be above the threshold, they will not have the opportunity to receive a positive or winning result. Accordingly, there is a strong incentive for the user to play at a high frequency of play.

Figure 4:
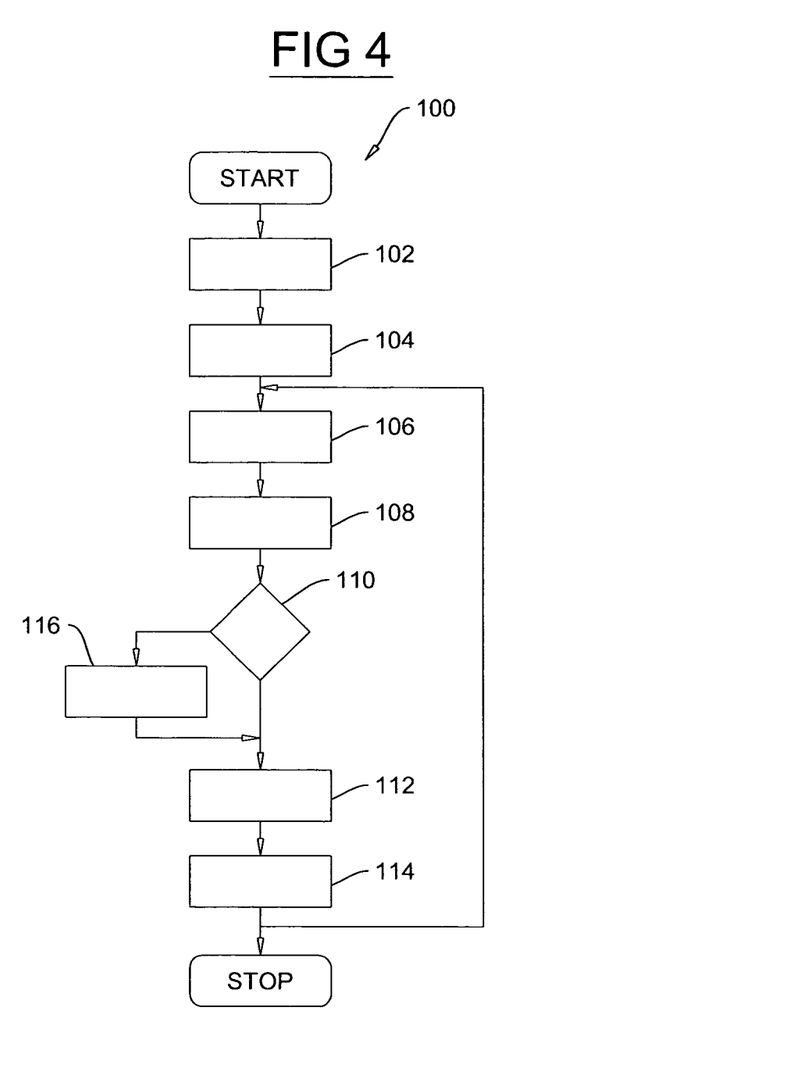
FIG. 4 is a flowchart showing the operation of the gaming device of FIG. 1 according to another embodiment.

With reference to FIG. 4, a flowchart for another process 100 of operating the gaming device 10 is illustrated. The process of FIG. 4 is similar to the process of FIG. 3. However in the process of FIG. 4, when the input frequency is greater than the threshold, the processor circuit will modify the variable interval schedule at step 116. In some embodiments, step 116 will modify the variable interval schedule such that the player will receive an award at a different average interval. In some embodiments the modified variable interval schedule will have a reduced average time between positive results relative to the unmodified schedule so as to reward players who play at a greater rate. In other embodiments, the modified schedule may have an increased average time between positive results relative to the unmodified schedule so as to provide an incentive to the player to continue to play at an increasingly higher and higher rate.

Figure 6:
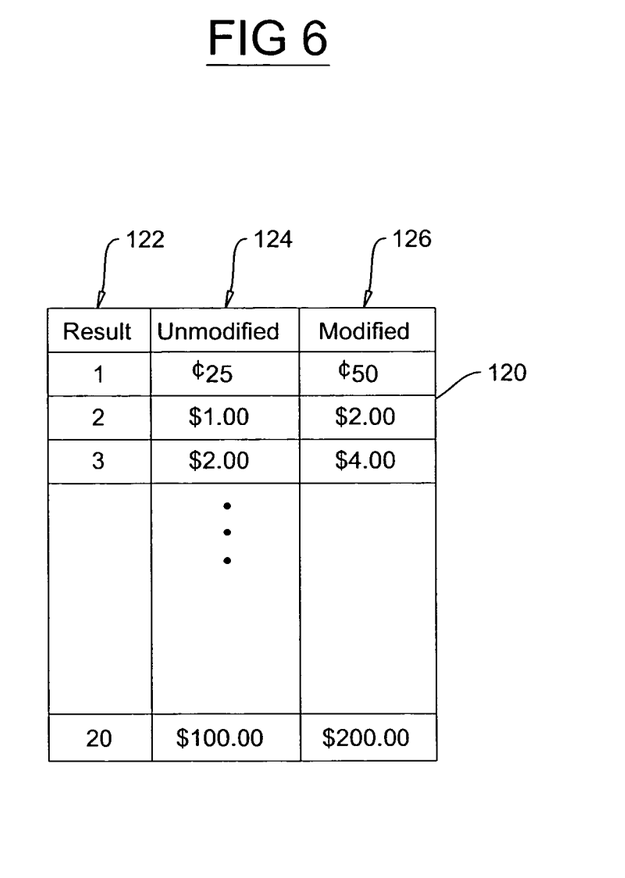
FIG. 6 is a schematic diagram illustrating one embodiment of a data table having a plurality of award values.

It will also be appreciated that in other embodiments, the modification step 116 may modify the amount at which the variable interval schedule pays out at. For example, as illustrated in FIG. 6, where an amount payment chart is illustrated generally at 120. As illustrated, for a given variable result 122, the gaming device 10 will pay out to the user the amount corresponding to that variable result from the unmodified column 124 if the input frequency has met the threshold and from the modified column 126 if the input frequency has met a second greater threshold. It will be appreciated that more than two thresholds and corresponding modification columns may also be used. As illustrated the modified column 126 may be a multiple of the unmodified column or may alternatively be a fraction of the unmodified column as will be appreciated in the art. The values in the modified column 126 may also not be a consistent modification of the unmodified values but may have different ratios for any given variable result 122. In the present embodiment, the gaming device 10 will not provide awards to the user unless their input frequency is above the threshold frequency, rather the gaming device will return the credits to the player. When the player's input frequency is above the threshold frequency, the gaming device will pay out the amount corresponding to the unmodified column 124. When the player's input frequency is above the second greater threshold, the gaming device 10 will pay out the amount corresponding to the modified column 126. In other embodiments, the gaming device 10 may include a further base payout column for use when the user's input frequency is not above the threshold frequency.

Figure 5:
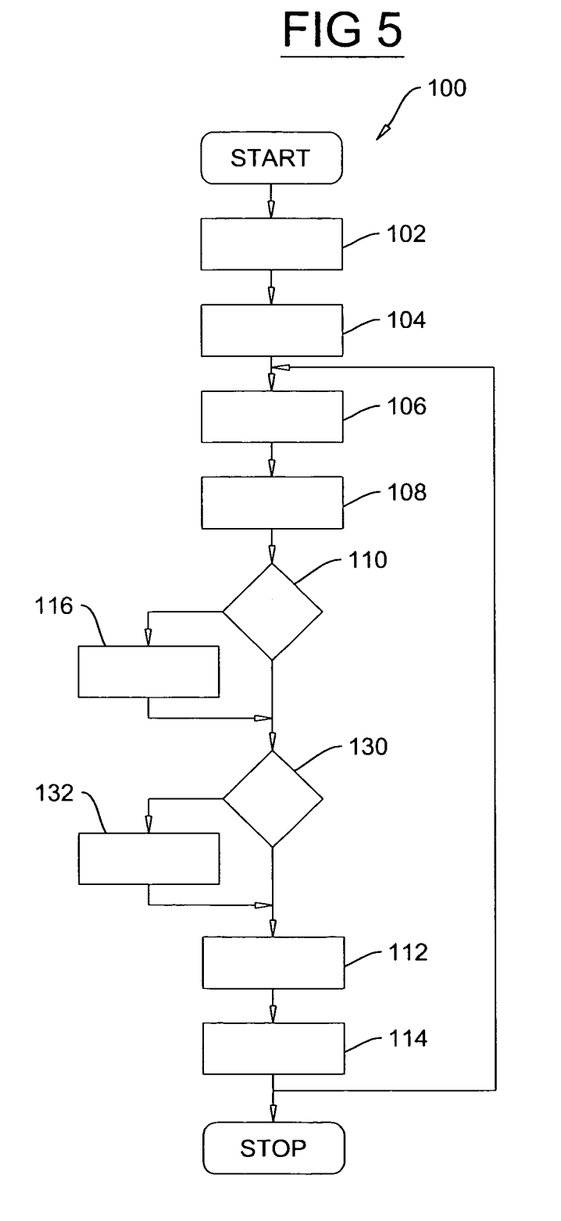
FIG. 5 is a flowchart showing the operation of the gaming device of FIG. 1 according to another embodiment.

According to another embodiment, the process 100 may include a plurality of comparisons against a plurality of thresholds. As illustrated in FIG. 5, the process 100 may include a first comparison 110 against a first threshold and a second comparison against a second threshold. As illustrated, the first threshold will be lower than the second, although other relative levels between the two may also be utilized. It will be appreciated that more than two comparisons may also be utilized. If the input frequency is greater than the first threshold, the processor circuit 20 will apply the first variable interval schedule modification step 116 to modify the award amounts. The processor circuit 20 will then compare the input frequency against the second threshold at 130. If the input frequency is greater than the second threshold, the processor circuit will apply a second variable interval schedule modification step 132 to modify the award amounts. It will be appreciated that the first and second modification steps 116 and 132 will be cumulative such that if the input frequency meets the lower threshold but not the higher threshold, the amount of modification to their award will not be as great as if the input frequency met both thresholds.

Figure 7:
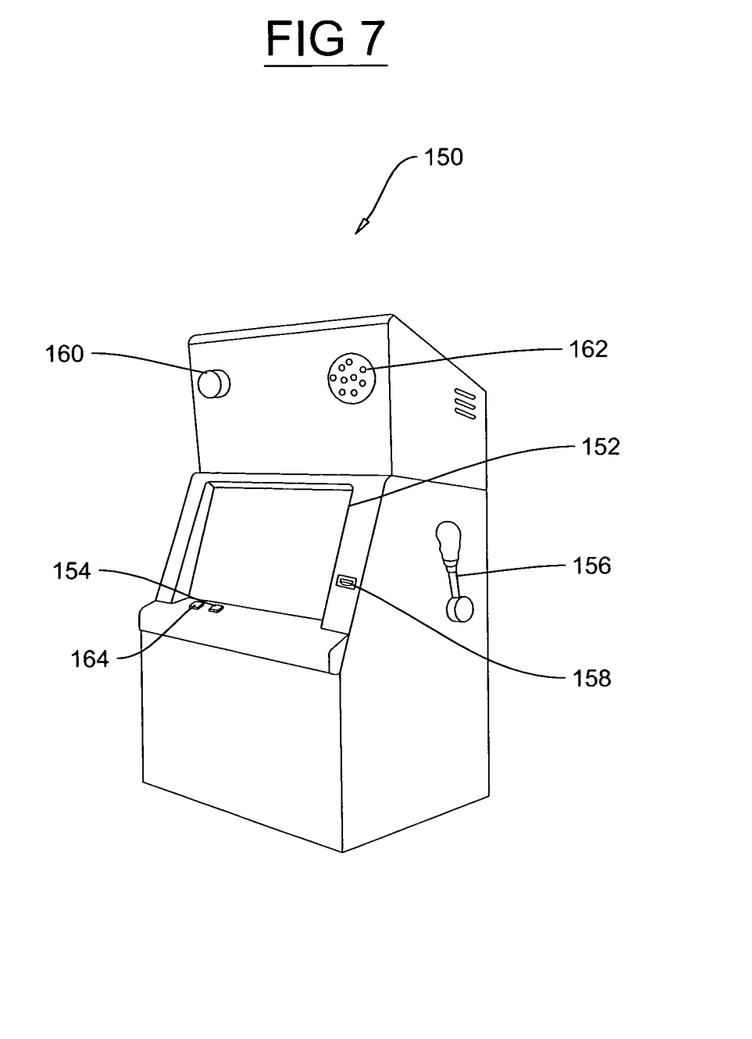
FIG. 7 is a perspective view of a gaming device according to one embodiment.

Turning now to FIG. 7, a gaming device according to a first embodiment is illustrated generally at 150. The gaming device includes a display screen 152, an input button 154 a pull arm 156 and a coin, currency or card receptacle 158 as are commonly known. The gaming device 150 as illustrated also includes a light or other suitable visual indicator 160 for indicating to a user when their input frequency as described above is above a threshold so as to alert them when they have reached the desired level of play. The gaming device 150 may also include an auditory indicator for providing an auditory signal, to the user when their input frequency has reached the threshold. It will be appreciated that a plurality of lights 160 or speakers 162 may also be utilized to indicate to the user achieving one of a plurality of thresholds. Optionally, the present embodiment may have an input amplifier (not shown) adapted to multiply the user inputs received at the user control device communicated to the gaming device 150. The input amplifier may be adapted to determine when the user has pressed the input button 154 or pulled the pull arm 156 and multiply the number of presses of that button communicated to the gaming device 150. The amplifier may be useful for relieving the physical limitations of the user that may prevent them from participating in the desired behavior at the desired rate. The amplifier may be programmed into the processor circuit 20 or may be an optional signal multiplier unit between the input device and the processor circuit 20. The amplifier may be an optional play amplifier button 164 on the gaming device permitting the user to play a multiple number of times. For example, the play amplifier button 164 may be a button labelled "play 4 times" or the like. When the user presses the play amplifier button 164, the gaming device 150 will run 4 plays in succession thus permitting the user to play at the desired frequency without being limited by their physical ability to press the button or pull the lever at the required high rates.

Figure 8:
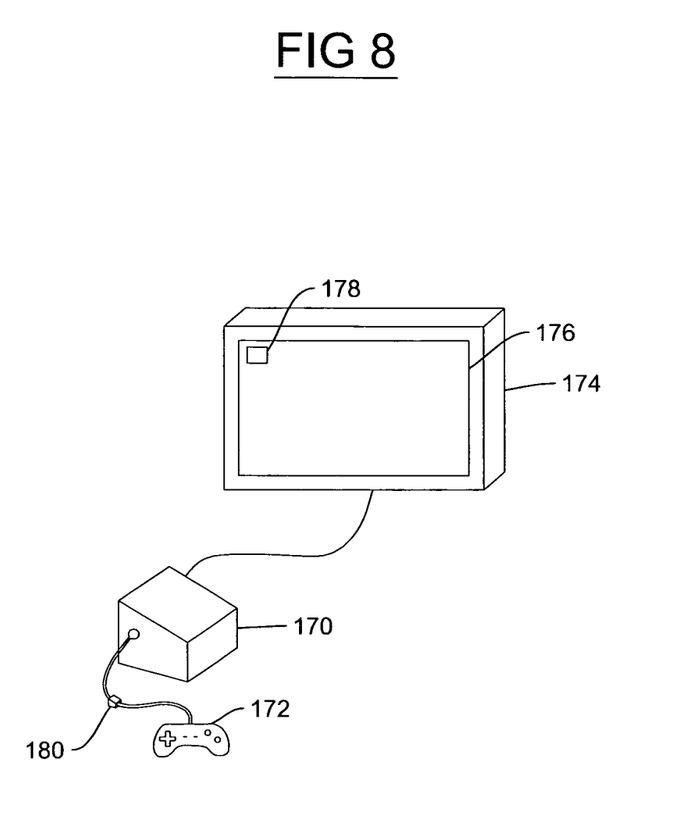
FIG. 8 is a perspective view of a gaming device according to another embodiment.

Turning now to FIG. 8, a gaming console 170 is illustrated utilizing the present method according to a further embodiment. The gaming console 170 includes a user control device 172 and is in communication with a monitor, television or the like 174 having a screen 176 to display the game being played thereon. The game played on the gaming console 170 may be adapted to display an intensity region 178 to provide an indication to the user that their input frequency on one or more of the control buttons on the user control device 172 has met a desired threshold. Optionally, the present embodiment may have an input amplifier 180 adapted to multiply the user inputs received at the user control device communicated to the gaming console 170. The input amplifier 180 may be adapted to determine when the user has pressed a specific button on the user control device 172 and multiply the number of presses of that button communicated to the gaming console 170. The input amplifier 180 may be useful for relieving the physical limitations of the user that may prevent them from participating in the desired behavior at the desired rate.

It will be appreciated that in the above description, the term play refers to a player placing a bet in the context of a gaming machine. In such contexts, the behavior that is to be reinforced is playing at a high rate. In other contexts, the behavior that is to be reinforced at high rates may be different. Thus it will be appreciated that although the above methods are described as applied to a gaming device, they will be useful to other situations as well. It will be appreciated that the present system is a general method to modify a specific behavior. In gaming devices, the behavior that may be sought to be modified, is the rate of play of the user. By way of non-limiting example, the behavior to be reinforced may be receiving service calls at a high rate in the context of a call service center or the high rate of assembly of pieces for a pieceworker. Schedules of pay in industry, salesmanship, and the professions, and the use of bonuses, incentive wages, and so on, may also be improved with the use of the present method to generate maximum productivity.

While specific embodiments of the invention have been described and illustrated, such embodiments should be considered illustrative of the invention only and not as limiting the invention as construed in accordance with the accompanying claims.

What is claimed is:

1. A method of operating a device to modify a behavior of a user, wherein said behavior comprises the rate of inputs provided by the user, the method comprising:
    initiating authorization at an authorizing device, said authorizing device comprises at least one of a token receipt slot, and wherein said initiating comprises inputting a token via said token receipt slot;
    receiving a plurality of inputs from the user at a user input device, wherein said user input device comprises a control device and an amplifying device, said amplifying device, when activated by the user, is adapted to multiply the user's input received at the control device;
    calculating a time-based frequency of inputs from said plurality of inputs using a processor circuit operable to receive said plurality of inputs from said user input device, wherein said processor circuit is in communication with a memory that stores at least two predetermined thresholds, a first threshold and a second threshold;
    determining, using said processor circuit, a positive game result of said inputs according to a variable interval schedule of reinforcement only when said time-based frequency of inputs is above one or more of said predetermined thresholds, wherein said determining comprises:
        comparing said time-based frequency of inputs against said predetermined thresholds using said processor circuit, wherein:
        if the time-based frequency of inputs is greater than the first threshold but less than the second threshold, determine an unmodified positive game result; and if the time-based frequency of the inputs is greater than both the first threshold and the second threshold, determine a modified positive game result;
    wherein said variable interval schedule of reinforcement comprises a plurality of varied time intervals with a specified average time interval, and causes a reduced average time between positive game results as the time-based frequency of inputs is above one or more of the predetermined thresholds; and
    providing said positive game result to said user.

2. The method of claim 1 wherein said device is a gaming device.

3. The method of claim 2 further comprising providing a visual representation to said user representing time-based frequency of inputs at an output device.

4. The method of claim 2 further comprising displaying said positive game result to said user on a display, wherein said positive game result is a winning game result.

5. A non-transitory computer readable medium encoded with processing instructions for implementing the method of claim 1.

6. A gaming device comprising:
    a display;
    an authorizing device for initiating authorization, said authorizing device comprises at least one of a token receipt slot, and wherein said initiating comprises inputting a token via said token receipt slot;
    an input device for receiving inputs from a user, said input device comprises a control device and an amplifying device, wherein said amplifying device, when activated by the user, is adapted to multiply the user's input received at the control device;
    a timer;
    a memory for storing at least two predetermined thresholds, a first threshold and a second threshold;
    a processor circuit for calculating a time-based frequency of inputs from said input device, wherein said processor circuit is in communication with said display, said authorizing device, said input device, said timer and said memory,
    wherein said processor circuit is configured for determining a positive game result of said inputs by utilizing at least one variable interval schedule of reinforcement only when said time-based frequency is above one or more of said predetermined thresholds, wherein said determining comprises:
        comparing said time-based frequency of inputs against said predetermined thresholds using said processor circuit, wherein:
        if the time-based frequency of inputs is greater than the first threshold but less than the second threshold, determine an unmodified positive game result; and if the time-based frequency of inputs is greater than both the first threshold and the second threshold, determine a modified positive game result;
    wherein said variable interval schedule of reinforcement comprises a plurality of varied time intervals with a specified average time interval, and causes a reduced average time between positive game results as the time-based frequency of the inputs is above one or more of the predetermined thresholds; and
    said processor circuit being operable to cause said display to display said positive game result to said user.

7. The gaming device of claim 6 wherein said positive game result is determined according to one of a plurality of variable interval schedules of reinforcement.

8. The gaming device of claim 7 wherein each of said variable interval schedules of reinforcement has a unique predetermined time-based frequency threshold of inputs.

9. The gaming device of claim 7 wherein each of said plurality of variable interval schedules of reinforcement has a unique level at which positive game results are provided to a user.

10. The gaming device of claim 6 wherein said positive game result is determined according to a first variable interval schedule of reinforcement when said time-based frequency of inputs is above said predetermined time-based frequency threshold of inputs and wherein said processor circuit determines no game result when said time-based frequency of inputs is below said predetermined time-based frequency threshold of inputs.

11. The gaming device of claim 6 wherein said processor circuit is operable to cause said display to provide a prompt to said user, said prompt instructing said user to provide inputs at a greater time-based frequency when said time-based frequency of inputs is below said predetermined time-based frequency threshold of inputs.

12. The gaming device of claim 6 further comprising an indicator for providing an indication to said user representing said time-based frequency of inputs as calculated by said processor circuit.

13. The gaming device of claim 12 wherein said processor circuit causes said indicator to indicate to said user that said time-based frequency of inputs is greater than a predetermined time-based frequency threshold of inputs.

14. The gaming device of claim 13 wherein said indicator comprises a visual indicator.

\* \* \* \* \*